United States Patent
Becker et al.

(10) Patent No.: US 6,281,285 B1
(45) Date of Patent: Aug. 28, 2001

(54) SILICONE RESINS AND PROCESS FOR SYNTHESIS

(75) Inventors: Gregory Scott Becker, Sanford; Leslie Earl Carpenter, II; Russell Keith King, both of Midland, all of MI (US); Tetsuyuki Michino, Kanagawa Prefecture (JP); Eric Scott Moyer, Midland, MI (US)

(73) Assignees: Dow Corning Corporation, Midland, MI (US); Dow Corning Asia, Ltd., Tokyo (JP)

( * ) Notice: Subject to any disclaimer, the term of this patent is extended or adjusted under 35 U.S.C. 154(b) by 0 days.

(21) Appl. No.: 09/328,806

(22) Filed: Jun. 9, 1999

(51) Int. Cl.[7] ................................ C08G 77/08

(52) U.S. Cl. .................. 524/837; 528/23; 528/12

(58) Field of Search ................ 528/23, 12; 524/837

(56) References Cited

U.S. PATENT DOCUMENTS

| | | | | |
|---|---|---|---|---|
| 5,010,159 | * | 4/1991 | Bank et al. | 528/23 |
| 5,973,095 | * | 10/1999 | Hacker et al. | 528/12 |
| 6,043,330 | * | 3/2000 | Hacker et al. | 528/12 |

* cited by examiner

*Primary Examiner*—Margaret G. Moore
(74) *Attorney, Agent, or Firm*—William F. Boley; Rick D. Streu; Sharon K. Severance

(57) ABSTRACT

A method for hydrolyzing chlorosilanes having at least three chlorine atoms bonded to each silicon atom to form silicone resins. The method comprises adding at least one of hydridotrichlorosilane, tetrachlorosilane, or organotrichlorosilane to a two-phase mixture comprising a non-polar organic solvent, an aqueous phase comprising 0 to about 43 weight percent hydrochloric acid, and a surface active compound selected from the group consisting of alkylsulphonic acid hydrate, alkali metal salt of alkylsulphonic acid, arysulphonic acid hydrate, and alkali metal salt of arylsulphonic acid.

20 Claims, No Drawings

SILICONE RESINS AND PROCESS FOR SYNTHESIS

BACKGROUND OF INVENTION

The present invention is an improved method for hydrolyzing chlorosilanes having at least three chlorine atoms bonded to each silicon atom to form silicone resins. The method comprises adding at least one of hydridochlorosilane, tetrachlorosilane, or organochlorosilane to a two-phase mixture comprising a non-polar organic solvent, an aqueous phase comprising 0 to about 43 weight percent hydrochloric acid, and a surface active compound selected from the group consisting of alkylsulphonic acid hydrate, alkali metal salt of alkylsulphonic acid, arysulphonic acid hydrate, and alkali metal salt of arylsulphonic acid.

It is well known in t he prior art that halosilanes readily hydrolyze in the presence of water to form silanols which condense to form polysiloxanes. Furthermore, it is well known that these two processes occur almost simultaneously when the halosilane contains three or more halogen atoms. The result of this rapid hydrolysis and condensation is an insoluble gel which is of little practical value. See, for example, Boldebuck, U.S. Pat. No. 2,901,460.

Numerous solutions to the above problem have been suggested. Boldebuck, supra, described for instance utilizing a hydrolysis medium comprising tetrahydrofuran and water to alleviate the gelling. Frye et al., U.S. Pat. No. 3,615,272 describe a process for forming hydrogensilsesquioxane resin comprising reacting a silane in a hydrocarbon solvent with sulfuric acid and an aromatic hydrocarbon, washing the reaction mixture with water and sulfuric acid until neutral and recovering the product by evaporation of the solvent.

Bank et al., U.S. Pat. No. 5,010,159, teach a method of hydrolyzing hydridosilanes with 2 or more hydrolyzable groups which comprises forming an arylsulfonic acid hydrate containing reaction medium, adding the silane to the reaction medium, facilitating hydrolysis of the silane to form the polyester, and recovery of the polymer. It is taught that the arylsulfonic acid hydrate containing reaction medium can be formed either by dissolving an arylsulfonic acid hydrate in a solvent, such as an alcohol, or it can be generated by the preferred method of reacting an aromatic hydrocarbon with concentrated sulfuric acid.

Ezerets et al., SU (11) 1147723, teach a method of hydrolysis of methylchlorosilane alone or as a cohydrolysis with diorganodichlorosilanes or organotrichlorosilanes, with a functionality of 2.9 to 3 in a mixture of an aromatic hydrocarbon solvent and a water-miscible solvent. The method is characterized by the water-miscible solvent comprising acetic acid and concentrated hydrochloric acid and the presence of a water-soluble cationic surfactant. The water-soluble cationic surfactants are described as amine hydrochlorides, quaternary ammonium salts, and salts of protonated carboxylic acids, which contain 6 to 20 carbon atoms.

Hacker et al., WO 98/47941, describe a process for preparing hydridosiloxane and organohydridosiloxane resins. The process involves the steps of contacting a silane monomer with a phase transfer catalyst in the presence of a reaction mixture that includes a nonpolar solvent and a polar solvent. Hacker et al. state that the phase transfer catalysts are quaternary ammonium salts.

Shkolnik et al., SU (11) 1666469, describe a process for preparation of oligoorganohydridosiloxanes comprising conducting an acid hydrolysis of a mixture of phenyltrichlorosilane or vinyltrichlorosilane, dimethyldichlorosilane, and hexamethyldisiloxane in the presence of a sulfonated copolymer of divinylbenzene and styrene.

It is also known that nonionic surface active agents can effect the hydrolysis of diorganochlorosilanes. For example, Williams, U.S. Pat. No. 4,412,080, teaches that cyclic dimethylpolysiloxanes can be prepared by hydrolysis of dimethyldichlorosilane and aqueous hydrochloric acid in the presence of a normal $C_{6-16}$ alkyl sulfonic acid to give good yields of cyclic polysiloxanes.

The present invention is a process for producing silicone resins in high yield which are readily soluble in non-polar solvents. The method has the advantage of (1) not requiring the use of sulfuric acid, (2) not having the solvent be a reactant in the system as when the solvent is reacted with sulfuric acid to form an arylsulfonic acid hydride, thereby making the process easier to control, (3) having the hydrogen chloride generated by the hydrolysis of the chlorosilanes separate from the mixture as an anhydrous gas and thus is in a form in which it can be recycled to the method or otherwise used, and (4) allowing the aqueous layer containing the hydrochloric acid and the surface active agent to be directly recycled back into the method.

Resins prepared by the present method are unique in that for a given monomer distribution at a similar percent solids, they tend to favor a high degree of intramolecular cyclization relative to resins prepared by other procedures. Additionally, thin films of cured resins prepared by the present method can have high resistance to environmental induced stress cracking.

Polymers formed by the present method have excellent coating and sealing characteristics when cured to their ceramic or ceramic-like state. Such polymers have utility, for example, in coating electronic devices to form protective barriers.

SUMMARY OF INVENTION

The present invention is a method for hydrolyzing chlorosilanes having at least three chlorine atoms bonded to each silicon atom to form silicone resins. The method comprises adding at least one of hydridotrichlorosilane, tetrachlorosilane, or organotrichlorosilane to a two-phase mixture comprising a non-polar organic solvent, an aqueous phase comprising about 0 to about 43 weight percent hydrochloric acid, and a surface active compound selected from the group consisting of alkylsulphonic acid hydrate, alkali metal salt of alkylsulphonic acid, arysulphonic acid hydrate, and alkali metal salt of arylsulphonic acid.

DESCRIPTION OF INVENTION

The present invention is a process for the preparation of a silicone resin. The process comprises adding at least one chlorosilane described by formula $$R_xSiCl_{4-x} \tag{1}$$

to a two-phase mixture comprising a non-polar organic solvent, an aqueous phase comprising 0 to about 43 weight percent hydrochloric acid, and a surface active compound selected from the group consisting of alkylsulphonic acid hydrate, alkali metal salt of alkylsulphonic acid, arysulphonic acid hydrate, and alkali metal salt of arylsulphonic acid, where x=0 or 1 and each R is selected from the group consisting of hydrogen and monovalent hydrocarbon radicals.

The chlorosilane added to the present process can be a hydridotrichlorosilane, organotrichlorosilane, tetrachlorosilane, or a mixture thereof. In formula (1), R can be hydrogen or a monovalent hydrocarbon radical as exemplified by alkyls such as methyl, ethyl, propyl, octyl, dodecyl, and octadecyl; cycloalkyls such as cyclopentyl or cyclohexyl; cycloalkenyls such as cyclopentenyl or cyclohexenyl; aryls such as phenyl, tolyl, and naphthyl; alkenyls such as vinyl, allyl, and pentenyl; aralkyls such as benzyl and gamma tolylpropyl; and substituted hydrocarbon radicals such as chloromethyl, 3,3,3-trifluoropropyl, and perfluoropropyl. Preferred is when R is selected from the group comprising hydrogen and hydrocarbon radicals comprising 1 to about 20 carbon atoms. Preferred chlorosilanes for use in the present method are trichlorosilane, and methyltrichlorosilane.

The chlorosilanes described by formula (1) can be hydrolyzed alone or as a mixture of two or more and in addition may be co-hydrolyzed with diorganodichlorosilanes described by formula $R_2SiCl_2$ where R is as defined above.

The chlorosilanes are generally utilized in the form of a liquid. This liquid may consist essentially of the chlorosilane in its liquid state or it may comprise the chlorosilane mixed with a non-polar organic solvent to form a solution. If a solvent is used, the solvent can be any suitable non-polar hydrocarbon or water insoluble chlorocarbon which is a solvent for the chlorosilane. Exemplary of such solvents are saturated aliphatics such as dodecane, n-pentane, n-hexane, n-heptane and isooctane; aromatics such as benzene, toluene, and xylene; cycloaliphatics such as cyclohexane; halogenated aliphatics such as trichloroethylene, perchloroethylene and 3-chloropropane; and halogenated aromatics such as bromobenzene and chlorobenzene. Additionally, combinations of the above solvents may be used together as co-solvents for the chlorosilane. The preferred non-polar organic solvents are aromatic compounds and of these toluene is most preferred.

In the present process, to obtain good product yields it is preferred that the chlorosilane be diluted in a non-polar organic solvent, with toluene being a preferred solvent. Dilution of the chlorosilane in a non-polar organic solvent prior to addition in the process can provide for better dispersion of the chlorosilane in the two-phase mixture thereby reducing gel formation and improving yield. The chlorosilane may comprise about 10 to 80 weight percent of the chlorosilane and non-polar organic solvent mixture. Preferably the chlorosilane comprises about 20 to 60 weight percent of the chlorosilane and non-polar organic solvent mixture.

The chlorosilane may be added to the present process by any of those standard methods known in the art in processes for hydrolyzing such chlorosilanes. However, to maximize yields, it is preferred that the chlorosilane be added by a method which insures rapid dispersion of the chlorosilane into the two-phase mixture. Such methods can include adding the chlorosilane in a slow flow below the liquid mixture with vigorous stirring.

In a preferred process the chlorosilane in a non-polar organic solvent is added to a rapidly stirred two-phase mixture comprising a non-polar organic solvent, aqueous hydrochloric acid, and the surface active compound. By "two-phase" mixture it is meant a mixture comprising an organic phase and an aqueous phase. The non-polar organic solvent comprising one phase of the two-phase mixture can be any of those non-polar organic solvents as described above for diluting the chlorosilane and can be the same or different than any non-polar organic solvent used to dilute the chlorosilane prior to addition to the process. It is preferred that the non-polar organic solvent comprising a component of the two-phase mixture be the same as any solvent used to dilute the chlorosilane, with toluene being the preferred solvent.

The aqueous phase comprising 0 to about 43 weight percent hydrochloric acid comprising the second phase of the two-phase mixture should comprise at least a stoichiometric amount of water in relation to the silicon bonded chlorine atoms and preferably a stoichiometric excess. Generally an excess of water in the range of about 30 to 1000 mole percent is preferred, with an excess in the range 250 to 800 mole percent excess being most preferred. Generally the aqueous phase can comprise 0 to about 43 weight percent hydrochloric acid, with the aqueous phase comprising about 15 to 37 percent hydrochloric acid being preferred.

An advantage of the present process is that hydrogen chloride formed as a result of the hydrolysis reaction can be evolved as anhydrous hydrogen chloride gas when the aqueous phase is saturated with hydrogen chloride. Therefore it is preferred that the aqueous phase comprise at least about 35 Wt. % hydrogen chloride. The evolved hydrogen chloride may then be recovered as a gas and recycled to the process or used for other applications. The hydrogen chloride present in the aqueous phase may be added to the method separate as an aqueous solution or may be generated in situ by hydrolysis of the chlorosilane.

The present process requires the presence of a surface active compound selected from the group consisting of alkylsulphonic acid hydrates, alkali metal salts of alkylsulphonic acids, arysulphonic acid hydrates, and alkali metal salts of arylsulphonic acids. The surface active compound can be, for example, alkyl sulfonic acid hydrates having the formula $C_nH_{(2n+1)}SO_3H$, where n=2 to about 16. The alkyl sulfonic acid hydrate may be, for example, $C_2H_5SO_3H$, $C_4H_9SO_3H$, $C_6H_{13}SO_3H$, $C_8H_{17}SO_3H$, $C_{10}H_{21}SO_3H$, $C_{12}H_{21}SO_3H$, and $C_{16}H_{33}SO_3H$. The surface active compound may by the corresponding metal salts of the alkylsulphonic acid hydrates where the alkali metal may be, for example, potassium or sodium. The alkali metal salt of the alkylsulphonic acid hydrate may be, for example, $C_6H_{11}SO_3^-Na^+$, $C_8H_{17}SO_3^-Na^+$, $C_{10}H_{21}SO_3^-Na^+$, $C_{12}H_{25}SO_3^-Na^+$, $C_{16}H_{33}SO_3^-Na^+$, and $C_8H_{17}SO_3^-K^+$. The surface active compound can be arysulphonic acid hydrates as exemplified by benzene sulfonic acid hydrate and the corresponding alkali metal salts, such as the sodium and potassium salts of toluene sulfonic acid hydrate. Preferred surface active compounds for use in the present method are selected from the group consisting of n-octane sulfonic acid hydrate, p-toluene sulfonic acid hydrate, benzene sulfonic acid hydrate, ethane sulfonic acid hydrate, n-butane sulfonic acid hydrate, and sodium n-dodecyl sulfonate.

The concentration of the surface active compound in the aqueous phase of the two-phase mixture may be within a range of about 0.1 to 60 weight percent, based upon the weight of the water added to the process. Generally, it is preferred that the concentration of surface active compound comprise about 0.5 to 10 weight percent of the water added to the process. Typically, even more preferred is when the concentration of the surface active compound comprises about 0.5 to 2 weight percent of the water added to the process.

The temperature at which the present process can be conducted is not limiting and can generally be within a range of about 0° C. to 100° C., with a temperature within a range of about 10° C. to 30° C. being preferred.

In the present process, if desired, residual hydroxyl groups on the silicon atoms of the resin may be reacted with an organosilyl end-capper such as described by formula $R_3SiCl$ where R is monovalent hydrocarbon group as previously described. Preferred is when the end-capper is a trialkylchlorosilane. Even more preferred is when the end-capper is trimethylchlorosilane.

After the hydrolysis reaction of the present process is completed and the silicone resin formed, the two-phase mixture can be phase separated by a method such as settling. This process may, for example, be accomplished by merely ceasing agitation of the hydrolysis mixture and allowing it to spontaneously separate into immiscible layers in the reaction vessel. The layers that form comprise an organic layer which contains the silicone resin and the solvent, and an aqueous layer containing hydrogen chloride and the surface active compound.

Either before, during, or after this separation, it may be desirable to allow the organic layer to set for a period of time to provide for further condensation of residual silicon bonded hydroxyl and chlorine atoms present on silicon atoms of the silicone resin, thus causing increased structuring and/or increase in molecular weight of the silicone resin. Typically it is preferred that this bodying process be allowed to occur before separation of the two phase, if bodying is to be allowed to occur. To provide for stability of the silicone resin produced by the present method a wash process with or without neutralization may be useful. If the organic layer is to be washed water alone may be used, but it is preferred that the wash solution be an aqueous sulfuric acid solution. Wash solutions containing greater than about 5 Wt. % sulfuric acid are generally useful. The organic layer, either washed or unwashed, can be contacted with a neutralizing agent preferably in the presence of water which promotes hydrolysis of remaining chlorine atoms. The neutralizing agent should be sufficiently basic to neutralize any remaining acid species such as sulfuric acid, hydrogen chloride, and organic acids without significant catalytic rearrangement of the silicone resin or reaction of silicon bonded hydrogen with water. Suitable bases can include, for example, calcium carbonate, sodium carbonate, sodium bicarbonate, ammonium carbonate, ammonia, calcium oxide, and calcium hydroxide. It is generally preferred that the neutralizing agent be in the form of a solid, since this facilitates easy separation of the neutralizing agent from the organic phase. It is also generally preferred that the organic phase after washing and/or neutralization be dried and if necessary filtered to remove any water insoluble salts or other insoluble particulates which may effect the silicone resin properties. Any suitable drying agent such as magnesium sulfate, sodium sulfate, or molecular sieves may be used. In addition, the water may be removed by azeotropic distillation.

The silicone resin formed by the present process may be retained as a solution in the reaction solvent or if desired a simple solvent exchange may be performed by adding a secondary solvent and distilling off the first. Alternatively, the solid form of the silicone resin may be recovered by removing the solvent by a standard process such as azeotropic distillation.

The silicone resins that can be made by the present process are variable depending on the chlorosilanes used. The following non-limiting list of possible hydrolysates and co-hydrolysates, however, are specifically contemplated: fully condensed and near fully condensed resins including: $(HSiO_{3/2})_s(RSiO_{3/2})_t$, $(HSiO_{3/2})_s(RSiO_{3/2})_t$, $(HSiO_{3/2})_x(R_2SiO)_y$, and $(RSiO_{3/2})_s(R_2SiO)_t$; corresponding partially condensed resins which contain silanol described by formulas $(HSiO_{3/2})_s(H(HO)SiO)_t$; $(RSiO_{3/2})_s(R(HO)SiO)_t$, $(HSiO_{3/2})_w(H(HO)SiO)_s(RSiO_{3/2})_t(R(HO)SiO)_z$, $(HSiO_{3/2})_w(H(HO)SiO)_s(R_2SiO)_t(R_2(HO)SiO_{1/2})_z$, $(RSiO_{3/2})_w(R(HO)SiO)_s(R_2SiO)_t(R_2(HO)SiO_{1/2})_z$, $(R_3SiO_{1/2})_s(SiO_2)_t((HO)SiO_{3/2})_z$; and corresponding triorganosilyl end-capped resins described by formulas $(R_3SiO_{1/2})_s(HSiO_{3/2})_t$, $(R_3SiO_{1/2})_s(RSiO_{3/2})_t$, $(R_3SiO_{1/2})_s(HSiO_{3/2})_t(RSiO_{3/2})_z$, $(R_3SiO_{1/2})_s(HSiO_{3/2})_t(R_2SiO)_z$, $(R_3SiO_{1/2})_s(RSiO_{3/2})_t(R_2SiO)_z$, $(R_3SiO_{1/2})_s(SiO_2)_t$, $(R_3SiO_{1/2})_w(HSiO_{3/2})_s(R_2SiO)_t(SiO_2)_z$, and $(R_3SiO_{1/2})_w(RSiO_{3/2})_s(R_2SiO)_t(SiO_2)_z$; where R is as previously described and each R can be the same or different, m is 8 or greater and the mole fractions of w, s, t, and z in the above copolymer silicone resins total 1.

The following examples are provided to illustrate the present invention. These examples are not intended to limited the scope of the claims herein.

Examples 1–16. For example 1, to a 1 L flask fitted with a stirrer and an addition funnel was added 151.5 g of 35 Wt. % HCl, 50.5 g of toluene sulfonic acid monohydrate, and 334 g of toluene. A solution consisting of 48.3 g of trichlorosilane in 55.6 g of toluene was placed in the addition funnel. The trichlorosilane solution was added to the flask with stirring over a period of 45 minutes. After completion of the addition, the flask contents were stirred for an additional 2 hours, the stirring stopped, and the flask contents allowed to separate into an aqueous phase and an organic phase. The organic phase was washed with two 100 ml portions of 47% sulfuric acid, neutralized with 25 g of solid calcium carbonate, dried using 50 g of magnesium sulfate, and filtered. Removal of the toluene from the organic phase yielded 17.5 g of a white powder, providing an 92 mole percent yield based on the trichlorosilane added to the flask. Examples 2–16 were done in a similar manner to example 1 using the amount of reagents shown in Table 1.

TABLE 1

| | Initial Reactor Charge | | | | Feed to Reactor | | | |
|---|---|---|---|---|---|---|---|---|
| Ref. No. | Toluene (g) | HCl (g) | $H_2O$ (g) | $PhSO_3H$ (g) | Toluene (g) | $HSiCl_3$ (g) | Rate (ml/min) | Yield (%) |
| 2 | 150.2 | 0 | 50 | 334.2 | 47.1 | 50 | 2 | 86.9 |
| 3 | 75 | 0 | 25 | 333.6 | 47.9 | 50 | 2 | 83.6 |
| 4 | 151.2 | 0 | 50 | 166 | 48.1 | 50 | 2 | 71 |
| 5 | 172 | 0 | 28 | 333 | 47.2 | 50 | 2 | 88 |
| 6 | 196 | 0 | 4 | 333 | 48.2 | 50 | 2 | 38 |
| 7 | 200 | 0 | 0 | 334.1 | 49.3 | 50 | 2 | 10 |
| 8 | 190 | 0 | 10 | 333.6 | 48.3 | 50 | 2 | 71 |
| 9 | 187 | 0 | 13 | 334 | 50 | 50 | 2 | 74 |
| 10 | 75.2 | 75.1 | 50.2 | 334 | 47.3 | 50 | 2 | 49.3 |
| 11 | 112.5 | 37.5 | 50.1 | 333.6 | 47.4 | 50 | 2 | 80.5 |

TABLE 1-continued

|  | Initial Reactor Charge | | | | Feed to Reactor | | | |
| --- | --- | --- | --- | --- | --- | --- | --- | --- |
| Ref. No. | Toluene (g) | HCl (g) | H$_2$O (g) | PhSO$_3$H (g) | Toluene (g) | HSiCl$_3$ (g) | Rate (ml/min) | Yield (%) |
| 12 | 37.5 | 113 | 50.2 | 332.2 | 50.2 | 50 | 2 | 5.6 |
| 13 | 37.5 | 0 | 12.5 | 333.4 | 48 | 50 | 2 | 69.2 |
| 14 | 18.8 | 0 | 6.3 | 333.5 | 48.3 | 50 | 2 | 46.5 |
| 15 | 151.3 | 0 | 50 | 83 | 47.9 | 50 | 2 | 59 |
| 16 | 150.2 | 0 | 50 | 42 | 50.5 | 50 | 2 | 33 |

Examples 17–33. For example 17, to a 1 L flask fitter with a stirrer and an addition funnel eas added 199 g of 35 Wt. % HCl, 1.0 g of sodium octyl sulfonate, and 333 g of toluene. A solution consisting of 47.3 g of trichlorosilane in 55 g of toluene was placed in the addition funnel. The trichlorosilane solution was added to the flask with stirring over a period of 50 minutes. After completion of the addition, the flask contents were stirred for an additional 2 hours, the stirring stopped, and the flask contents allowed to separate into an aqueous phase and an organic phase. The organic phase was washed with water, dried with magnesium sulfate, and filtered. Removal of the toluene from the organic phase yielded 16.3 g of a white powder, providing a 87.9 mole percent yield based on the trichlorosilane added to the flask. Examples 18–36 were done in a similar manner using the amounts of reagents shown in Table 2.

Examples 37–39. For example 37, to a 1 L flask fitter with a stirrer and an addition funnel was added 50.0 g of benzene sulfonic acid hydrate, 150 g of 35 Wt. % HCLl, and 333.6 g of toluene. To this mixture, while stirring at 600 rpm, a solution consisting of 50.0 g of methyltrichlorosilane in 55.5 g of toluene was added dropwise over a period of 65 minutes. After completion of the addition, the flask content was stirred for an additional 2 hours, the strring stopped, and the flask contents allowed to separate into an aqueous phase and an organic phase. The organic phase was washed twice with 100 ml of 47% sulfuric acid, neutralized with 25 g of solid calcium carbonate, dried with 50 g of solid magnesium sulfate, and filtered. Removal of the toluene from the organic phase yielded 16.5 g of a white powder, providing a 73.5 mole prcent yield based on the trichlorosilane added to the flask. Examples 38 and 39 were done in a similar manner using the amounts of reagents shown in Table 3.

TABLE 2

|  |  |  | Initial Reactor Charge | | | Feed to Reactor | | |
| --- | --- | --- | --- | --- | --- | --- | --- | --- |
| Ref. No. | Surfactant | Solvent | HCl[a] (g) | Solvent (g) | Surf. (g) | HSiCl$_3$ (g) | Solvent (g) | Yield % |
| 18 | None | PhMe[c] | 200 | 334 | 0 | 47.1 | 55.7 | 10 |
| 19 | BSA[b] | PhMe | 196 | 334 | 4 | 47.1 | 55.7 | 38 |
| 20 | BSN | Octane | 151 | 271 | 50.5 | 46.9 | 45.1 | 22 |
| 21 | BSA | 2-ClPr[d] | 150 | 333 | 50 | 59.8 | 55.0 | 51 |
| 22 | C$_2$H$_5$SO$_3$H | PhMe | 196 | 333 | 4 | 50.4 | 55.6 | 16 |
| 23 | C$_2$H$_5$SO$_3$H | PhMe | 180 | 334 | 20 | 48.9 | 55.5 | 35 |
| 24 | C$_2$H$_5$SO$_3$H | PhMe | 150 | 333 | 50 | 49.4 | 55.5 | 63 |
| 25 | C$_4$H$_9$SO$_3$H | PhMe | 196 | 333 | 4 | 49.1 | 55.5 | 42 |
| 26 | C$_4$H$_9$SO$_3$H | PhMe | 190 | 333 | 10 | 50 | 55.5 | 43 |
| 27 | C$_6$H$_{13}$SO$_3$H | PhMe | 196 | 333 | 4 | 48.4 | 55.4 | 89 |
| 28 | C$_6$H$_{13}$SO$_3$H | PhMe | 199 | 334 | 1 | 49 | 55.5 | 56 |
| 29 | C$_8$H$_{17}$SO$_3$Na | PhMe | 200 | 333 | 0.25 | 49.3 | 55.5 | 81.2 |
| 30 | C$_8$H$_{17}$SO$_3$Na | PhMe | 199 | 333 | 1 | 47.3 | 55.5 | 87.9 |
| 31 | C$_8$H$_{17}$SO$_3$Na | PhMe | 196 | 334 | 4 | 50.2 | 55.7 | 48 |
| 32 | C$_8$H$_{17}$SO$_3$Na | Octane | 196 | 270 | 4 | 48.2 | 45.0 | 65 |
| 33 | C$_8$H$_{17}$SO$_3$Na | PhMe | 180 | 334 | 20 | 48.3 | 55.5 | 29 |

[a] = 35 Wt. % aqueous HCl
[b] = benzene sulfonic acid hydrate
[c] = toluene
[d] = 2-chloropropane

TABLE 3

| | Initial Reactor Charge | | | | Feed to Reactor | | | |
|---|---|---|---|---|---|---|---|---|
| Ref. No. | Toluene (g) | HCl (g) | $H_2O$ (g) | $PhSO_3H$ (g) | Toluene (g) | $MeSiCl_3$ (g) | Rate (ml/min) | Yield (%) |
| 38 | 333.6 | 75 | 75 | 50 | 55.5 | 5.0 | 2 | 63 |
| 39 | 333.2 | 0 | 150 | 50 | 55.2 | 50 | 2 | 44 |

Examples 40–47. Methylsilsesquioxanes were formed by adding a toluene solution of methyltrichlorosilane to a flask containing concentrated hydrochloric acid (36 Wt. % in aqueous solution), toluene, and sodium octyl sulfonate (OctylSO$_3$Na) at the concentrations described in Table 1. Addition rates of the methytrichlorosilane were controlled using a syringe pump. The feed was directed through a Teflon tube the exit of which was submerged under the content of the flask. In Table 1, the heading "Initial Reactor Charge" refers to the amount in grams (g) of materials initially charged to the flask. The heading "Wt. Feed" refers to the total weight of toluene and trichlorosilane fed to the reactor as a mixture at the described rate ("Rate"). The heading "Workup No." refers to the process for treating samples after completion of addition of the feed materials, where workup method is referenced as a method 1, 2, or 3 which is as described below. The heading "% Yield" is the mole percent yield of product based on the methyltrichlorosilane added to the flask.

Workup No. 3. The reaction mixture was poured into a separatory funnel and the acid layer removed. The organic layer was placed into a three-necked flask with a bottom drain. Then, 100 ml of 47% sulfuric acid were added and the mixture was stirred. The resulting organic layer was washed three times with 5% sodium bicarbonate followed by two times with 100 ml of de-ionized water. The organic layer was then treated with 25 g of calcium carbonate with stirring for 10 minutes and 50 g of magnesium sulfate were added. The organic layer was filtered and solvent stripped under vacuum to yielded a resin as a white powder.

Selected samples as described above were analyzed by $^{29}$Si NMR and GPC referenced to polystyrene standards. The results are provided in Table 5.

In Table 2, the mole percent of silicon atoms having hydroxy substitution is labeled "SIOH" and the mole percent of silicon atoms having chlorine substitution is labeled "SiCl".

TABLE 4

| | Initial Reactor Charge | | | | Feed to Reactor | | | | |
|---|---|---|---|---|---|---|---|---|---|
| Ref. No. | Toluene (g) | HCl (g) | $H_2O$ (g) | $OctSO_3Na$ (g) | Toluene (g) | $MeSiCl_3$ (g) | Rate (ml/min) | Workup No. | Yield (%) |
| 40 | 330 | 199 | 0 | 1 | 55 | 51.9 | 2 | 1 | 86 |
| 41 | 330 | 199 | 0 | 1 | 55 | 51.9 | 2 | 2 | 99 |
| 42 | 330 | 199 | 0 | 1 | 155 | 51.9 | 1.8 | 2 | 100 |
| 43 | 330 | 199 | 0 | 1 | 155 | 51.9 | 1.8 | 2 | 100 |
| 44 | 333.8 | 199 | 0 | 1 | 55.5 | 50 | 1.8 | 3 | 100 |
| 45 | 333.5 | 199 | 0 | 1 | 55.5 | 50 | 1.8 | 3 | 97 |
| 46 | 333.5 | 99.5 | 99.5 | 1 | 55.5 | 50 | 1.8 | 3 | 86 |
| 47 | 333.5 | 0 | 199 | 1 | 55.5 | 50 | 1.8 | 3 | 61 |

Workup No. 1. A 64 g sample of the organic phase was taken at 2 hours after completion of addition of the feed materials and washed 6 times with 100 ml aliquots of deionized water. The sample was dried by azeotropic distillation at 55° C. under vacuum.

Workup No. 2. Samples 41 and 42 were treated by the following method 19 hours after completion of addition of the feed materials and sample 19 was treated immediately after completion of addition of the feed materials. For each sample the organic phase was separated and 1 equivalent of Me$_3$SiCl was added to the organic phase and the organic phase stirred for 3 hours at room temperature. A 64 g sample of the organic phase was then treated by the following wash steps: (1) 2×200 ml of 50 Wt. % $H_2SO_4$ for 10 minutes, (2) 1×200 ml of deionized water, (3) 1×200 ml of 5 Wt. % NaHCO$_3$ solution, and (4) 2×200 ml of deionized water. The resulting washed and neutralized organic phase was azeotropic distilled at 55° C. under vacuum to dryness.

TABLE 2

| | $^{29}$Si NMR | | GPC | |
|---|---|---|---|---|
| Ref No. | SiOH | SiCl | $M_n$ | $M_w$ |
| 40 | 0.21 | 0.01 | — | — |
| 41 | 0.12 | 0.01 | 1838 | 17800 |
| 42 | 0.14 | 0.01 | 1360 | 12390 |
| 43 | 0.22 | 0.02 | 716 | 4068 |

Examples 48–51. Various silicone resins were prepared by the co-hydrolysis of differing chlorosilanes as described in Table 3. The hydrolysis was conducted by providing an initial reactor charge comprising toluene, 36 Wt. % aqueous hydrochloric acid, and sodium octyl sulfonate, in the weights described in Table 3. Then mixtures of the chlorosilanes in toluene as described is Table 3 were fed to the reactor at the listed rates. After completion of addition of the feed materials each sample was worked up by the described method. The percent yield (Yield %) of the product based on the mole % of the chlorosilanes added to the reactor is reported in Table 6.

three times with 100 ml of a 5% sodium bicarbonate solution, three times with 100 ml of de-ionized water, neutralized with 25 g of solid calcium carbonate, dried with 50 of solid magnesium sulfate, and filtered. Removal of the toluene from the organic phase yielded 31.0 g of a white

TABLE 6

| | Initial Reactor Charge | | | Feed to Reactor | | | Work | |
|---|---|---|---|---|---|---|---|---|
| Ref. No. | [a]Tol. | HCl (g) | OctSO$_3$H (g) | Tol (g) | Silane (g) | Silane (g) | Rate (ml/min) | up No. | Yield (%) |
| 48 | 330 | 199 | 1 | 100 | [b]Pr$_f$SiCl$_3$ (40.2 g) | HSiCl$_3$ (23.5 g) | 2.5 | 4 | — |
| 49 | 330 | 199 | 1 | 60.6 | MeSiCl$_3$ (44.2 g) | Me$_2$SiCl$_2$ (6.7 g) | 2.0 | 5 | 100 |
| 50 | 330[c] | 199 | 1 | 80 | SiCl$_4$ (30 g) | Me$_3$SiCl (38.4 g) | 2.0 | 5 | 90 |
| 51 | 330 | 199 | 1 | 155 | MeSiCl$_3$ (25.9 g) | Me$_2$SiCl$_2$ (23.5 g) | 2.5 | 6 | — |

[a] = toluene
[b] = trifluoropropyl
[c] = initial reactor charge also contained Me$_3$SiCl Workup No. 4. A 64 g sample of the organic phase was taken 12 hours after completion of addition of the feed materials and washed 2 times with 200 ml of 50 Wt. % H$_2$SO$_4$. The sample was further washed with 200 ml of 5 Wt. % NaHCO$_3$ solution, at which time the sample gelled.

Workup No. 5. A sample of the organic phase was treated by the following procedure at 21 hours after completion of addition of the feed materials for sample 22 and at 16 hours after completion of addition of the feed materials for sample 23. A 64 g sample of each organic phase was treated by the following wash steps: (1) 2×200 ml of 50 Wt. % H$_2$SO$_4$ for 10 minutes, (2) 1×200 ml of 5 Wt. % NaHCO$_3$ for 20 minutes, and (3) 1×200 ml deionized water for 20 minutes. The resulting washed and neutralized organic phase was azeotropic distilled at 55° C. to dryness.

Workup No. 6. A sample of the organic phase was capped by treating with an excess of bis(trimethylsilyl) trifluoroacetamide in methylisobutylketone/toluene.

Worked up samples No. 49 and 50 where analyzed by "Si NMR and GPC referenced to MQ resin standards. The result are provided in Table 4 along with the empirical formulas. In the formulas M, D, T, and Q represent monofunctional, difimctional, trifuictional, and tetrafunctional siloxy units respectively.

TABLE 7

| Ref. No. | M$_n$ | M$_w$ | Empirical Formula |
|---|---|---|---|
| 49 | 1463 | 73330 | ((HO)Me$_2$SiO$_{3/2}$)$_{0.95}$(Me$_2$SiO)$_{17}$(OSiMeOH)$_{5.7}$ (O$_{3/2}$SiMe)$_{76.4}$ |
| 50 | 2570 | 6547 | M$_{47.7}$T(OH)$_{3.2}$Q$_{49.1}$ |

Example 52. To a 1 L flask fitted with a stirrer and an addition fimnel was added 1 g of sodium octyl sulfonate, 199 g of 35 Wt. % HCl, and 333.5 g of toluene. While stirring at 500 rpm, a solution consisting of 50.0 g of phenyltrichlorosilane in 55.5 g of toluene were added dropwise over a period of 150 minutes. After completion of the addition, the flask content was stirred for an additional 70 hours, the stirring stopped, and the flask content allowed to separate into an aqueous phase and an organic phase. The organic phase was washed twice with 100 ml of 47% sulfiric acid, powder, providing a 102 mole percent yield based on the phenyltrichlorosilane added to the flask.

Example 53–55. Into a 9 L baffled reactor was placed 1.5 kg of 37% hydrochloric acid, 0.010 kg of sodium octyl sulfate, and amounts of toluene as described in Table 8. A stirrer was set to 900 rpm and a soltion of 0.50 kg of methyltrichlorosilane dissolved in 0.50 kg of toluene was added to the reactor at 12 ml/min at ambient temperature. After the addition, the mixture was allowed to stir at ambient temperature for 14 h. Stirring was stopped, and the phases separated. The organic phase was washed six to eight times with 1 L portions of deionized water until the pH of the wash water reaced pH 4. The organic phase was dried with 50 g of MgSO$_4$ and then vacuum filtered through filter paper. The organic solution was concentrated by use of a rotary evaporator at 40° C. The dry resin was placed under vacuum overnight to remove residual solvent. The material obtained from the above procedure was a white solid weighing about 0.22 Kg. Absolute molecular weight information was obtained by a Light Scattering Triple Detection GPC technique. The molecular weight information of the different materials are listed below.

TABLE 8

| Ref. No. | Toluene (Kg) | M$_n$ | M$_w$ |
|---|---|---|---|
| 53 | 1.0 | 7,220 | 303,900 |
| 54 | 2.0 | 6,920 | 27,300 |
| 55 | 3.3 | 2,240 | 9,490 |

Example 56. To a 1 L flask equipped with a condenser, nitrogen inlet, mechanical stirrer, addition funnel, and temperature probe were added 152.37 g of 37 Wt. % hydrochloric acid and 0.9908 g of sodium octyl sulfonate. After the sodium octyl sulfonate was dissolved, 335.34 g of toluene were added. A feed solution was made comprising 34.57 g of octadecyltrichlorosilane, 52.97 g of methyltrichlorosilane, and 87.37 g of toluene. The feed solution was added dropwise to the flask over a 1 hour period and the resulting mixture stirred at ambient temperature overnight. Upon ceasing stirring, the mixture separated into an organic phase and an aqueous phase. The aqueous phase was removed and the organic phase washed four times with 300 ml of deionized water at 55° C. The organic phase was then dried over magnesium sulfate and concentrated in vacuo to yield 37.89 g (74% yield) of siloxane resin with an $M_n$ of 9,680 and an $M_w$ of 66,800.

Example 57. To a 1 L flask equipped as described in Example 56 were added 152.74 g of 37 Wt. % hydrochloric acid and 335.14 g of toluene. A feed solution was made comprising 34.75 g of octadecyltrichlorosilane, 52.74 g of methyltrichlorosilane, and 87.02 g of toluene. The feed solution was added dropwise to the flask over a 1 hour period and the resulting mixture stirred at ambient temperature overnight. Upon ceasing stirring, the reaction mixture separated into an organic phase and an aqueous phase. The aqueous phase was removed and the organic phase was washed four times with 300 ml of deionized water at 55° C. The organic phase was then dried over magnesium sulfate and concentrated in vacuo to yield 27.91 g (55% yield) of siloxane resin with an $M_n$ of 1,650 and an $M_w$ of 105,650.

Example 58. To a 1 L flask equipped as described in Example 56 were added 151.01 g of 37 Wt. % hydrochloric acid and 0.9967 g of sodium octyl sulfonate. After the sodium octyl sulfonate was dissolved, 200.88 g of toluene were added. A feed solution was made comprising 43.55 g of octadecyltrichlorosilane, 48.35 g of methyltrichlorosilane, and 88.50 g of toluene. The feed solution was added dropwise to the flask over 36 minutes and the resulting mixture allowed to stir at ambient temperature overnight. Upon ceasing stirring, the mixture separated into an organic phase and an aqueous phase. The aqueous phase was removed and the organic phase was washed four times with 300 ml of deionized water at 65° C. The organic phase was then dried over magnesium sulfate and concentrated in vacuo to a solid. This solid was redissolved in 200 ml of THF and 10 ml of deionized water added. After stirring for one hour, this mixture was stripped to a solid under vacuum to yield 60.54 g (108% yield) of siloxane resin with an $M_n$ of 7,260 and an $M_w$ of 51,000.

Example 59. To a 1 L flask equipped as described in Example 56 were added 150.83 g of 37 Wt. % hydrochloric acid and 0.9911 g of sodium octyl sulfonate. After the sodium octyl sulfonate was dissolved, 201.28 g of toluene were added. A feed solution was made comprising 53.99 g of phenethyltrichlorosilane, 34.01 g of methyltrichlorosilane, and 87.15 g of toluene. The feed solution was added dropwise to the flask over 45 minutes and the resulting mixture stirred at ambient temperature overnight. Upon ceasing stirring, the mixture separated into an organic phase and an aqueous phase. The aqueous phase was removed and the organic phase washed four times with 300 ml of deionized water. The organic phase was dried over magnesium sulfate and concentrated in vacuo to yield 41.88 g (83% yield) of siloxane resin with an $M_n$ of 9,300 and an $M_w$ of 204,500.

We claim:

1. A process for the preparation of a silicone resin comprising adding at lease one chlorosilane described by the formula $R \times SiCl_{4-x}$ to a two-phase mixture comprising
   (I) a nonpolar organic solvent,
   (II) an aqueous phase comprising
      (i) an amount of water to comprise at least a stoichiometric amount in relation to the chlorosilane,
      (ii) 0 to 43 weight percent hydrochloric acid based on the aqueous phase, and
      (iii) a surface active compound selected from the group consisting of alkylsulphonic acid hydrate, alkali metal salt of alkylsulphonic acid, arylsulphonic acid hydrate and alkali metal salt of arylsulphonic acid,
   where X=0 or 1 and each R is selected from the group consisting of hydrogen and monovalent hydrocarbon radicals.

2. A process according to claim 1 comprising adding hydridotrichlorosilane and an organotrichlorosilane.

3. A process according to claim 1 comprising adding hydridotrichlorosilane and an organotrichlorosilane selected from the group consisting of methyltrichlorosilane, t-butyltrichlorosilane, and (3,3,3-trifluoropropy) trichlorosilane.

4. A process according to claim 1 comprising adding hydridotrichlorosilane and methyltrichlorosilane.

5. A process according to claim 1, where the chlorosilane is diluted in a non-polar organic solvent prior to adding to the process.

6. A process according to claim 1, where the chlorosilane is diluted in toluene prior to adding to the process.

7. A process according to claim 1, where the aqueous phase comprises about 15 to 37 weight percent hydrochloric acid based on the aqueous phase.

8. A process according to claim 1, where the surface active compound is an alkyl sulfonic acid hydrate described by formula $C_nH_{(2n+1)}SO_3H$, where n=2 to about 16.

9. A process according to claim 1, where the surface active compound is an alkali metal salt of an alkylsulphonic acid hydrate.

10. A process according to claim 1, where the surface active compound is selected from the group consisting of arylsulphonic acid hydrate and alkali metal salt of an arylsulphonic acid hydrate.

11. A process according to claim 1, where the surface active compound is selected from the group consisting of ethane sulfonic acid hydrate, n-butane sulfonic acid hydrate, n-octane sulfonic acid hydrate, sodium n-dodecyl sulfonate, p-toluene sulfonic acid hydrate, and benzene sulfonic acid hydrate.

12. A process according to claim 1, where the surface active compound concentration is within a range of about 0.1 to 10 weight percent, based upon the weight of water in the two-phase mixture.

13. A process according to claim 1, where the surface active compound concentration is within a range of about 0.5 to 2 weight percent, based upon the weight of water in the two-phase mixture.

14. A process according to claim 1, where the two-phase mixture is separated into an organic phase comprising the silicone resin and an aqueous phase and the organic phase is allowed to set for a period of time sufficient for further condensation of residual silicon bonded hydroxyl and chlorine atoms.

15. A process according to claim 1, where the two-phase mixture is separated into an organic phase comprising the silicone resin and an aqueous phase and the organic phase is washed with water to reduce residual chloride content.

16. A process according to claim 1, where the two-phase mixture is separated into an organic phase comprising the silicon resin and an aqueous phase and the organic phase is contacted with a neutralizing agent.

17. A process according to claim 1, where the two-phase mixture is separated into an organic phase comprising the silicon resin and an aqueous phase and the organic phase is allowed to set for a period of time sufficient for further condensation of residual silicon bonded hydroxyl and chlorine atoms and the organic phase is washed with water to reduce residual chloride content and then contacted with a neutralizing agent.

18. A process according to claim 1, where the chlorosilane has at least three silicon bonded chlorine atoms and where the aqueous hydrochloric acid provides a stoichiometric excess of water to the process in the range of about 30 to 1000 mole percent based on the silicon bonded chlorine atoms.

19. A process according to claim 1, where the chlorosilane has at least three silicon bonded chlorine atoms and where the aqueous hydrochloric acid provides a stoichiometric excess of water to the process in the range of about 250 to 800 mole percent based on the silicon bonded chlorine atoms.

20. A process for the preparation of a silicone resin comprising (A) adding at least one chlorosilane described by formula $R_xSiCl_{4-x}$ to a two phase mixture comprising a nonpolar organic solvent, an aqueous phase comprising an amount of water to comprise at least a stoichiometric amount in relation to the chlorosilane, 0 to about 43 weight percent hydrochloric acid based on the aqueous phase, and a surface active compound selected from the group consisting of alkylsulphonic acid hydrate, alkali metal salt of alkylsulphonic acid, arysulphonic acid hydrate, and alkali metal salt of arylsulphonic acid and (B) separating the two phase-mixture into an organic phase comprising the silicone resin and an aqueous phase, where the silicone resin is selected from the group consisting of fully condensed resins described by formulas $(HSiO_{3/2})_m$, $(RSiO_{3/2})_m$, $(HSiO_{3/2})_s(RSiO_{3/2})_t$, $(HSiO_{3/2})_s(R_2SiO)_t$, and $(RSiO_{3/2})_s(R_2SiO)_t$; partially condensed resins which contain silanol described by formulas $(HSiO_{3/2})_s(H(HO)SiO)_t$, $(RSiO_{3/2})_s(R(HO)SiO)_t$, $(HSiO_{3/2})_w(H(HO)SiO)_s(RSiO_{3/2})_t(R(HO)SiO)_z$, $(HSiO_{3/2})_w(H(HO)SiO)_s(R_2SiO)_t(R_2(HO)SiO_{1/2})_z$, $(RSiO_{3/2})_w(R(HO)SiO)_s(R_2SiO)_t(R_2(HO)SiO_{1/2})_z$, and $(R_3SiO_{1/2})_s(SiO_2)_t((HO)SiO_{3/2})_z$; and triorganosilyl end-capped resins described by formulas $(R_3SiO_{1/2})_s(HSiO_{3/2})_t$, $(R_3SiO_{1/2})_s(RSiO_{3/2})_t$, $(R_3SiO_{1/2})_s(HSiO_{3/2})_t(RSiO_{3/2})_z$, $(R_3SiO_{1/2})_s(HSiO_{3/2})_t(R_2SiO)_z$, $(R_3SiO_{1/2})_s(RSiO_{3/2})_t(R_2SiO)_z$, $(R_3SiO_{1/2})_s(SiO_2)_t$, $(R_3SiO_{1/2})_w(HSiO_{3/2})_s(R_2SiO)_t(SiO_2)_z$, and $(R_3SiO_{1/2})_w(RSiO_{3/2})_s(R_2SiO)_t(SiO_2)_z$;

where each R is selected from the group consisting of hydrogen and monovalent hydrocarbon atoms and R can be the same or different, X=0 or 1, m is 8 or greater and the mole fractions of w+s+t+z=1.

* * * * *